United States Patent [19]
Potter

[11] Patent Number: 5,228,811
[45] Date of Patent: Jul. 20, 1993

[54] TOOL TO ASSIST IN THE REMOVAL OF RIVETS

[75] Inventor: Norman O. Potter, Encinitas, Calif.

[73] Assignee: General Dynamics Corporation, Convair Division, San Diego, Calif.

[21] Appl. No.: 838,130

[22] Filed: Feb. 19, 1992

[51] Int. Cl.⁵ ............................................. B23B 51/00
[52] U.S. Cl. ....................................... 408/84; 408/112
[58] Field of Search ................... 408/84, 97, 110–112, 408/117–119, 241 S

[56] References Cited

U.S. PATENT DOCUMENTS

| | | | |
|---|---|---|---|
| 718,996 | 1/1903 | Franz | 408/84 |
| 757,950 | 4/1904 | McElwain et al. | 408/84 |
| 2,192,528 | 3/1940 | Schmidt | 408/112 |
| 2,296,087 | 9/1942 | Burns, Jr. | 408/84 X |
| 2,375,112 | 5/1945 | Kanihun | 408/84 |
| 2,576,786 | 11/1951 | Gray et al. | 408/112 X |
| 3,044,325 | 7/1962 | Halpen | 408/119 |
| 3,233,260 | 2/1986 | Halpern | 408/119 |
| 3,620,635 | 11/1971 | DalBianco | 408/112 X |
| 4,138,200 | 2/1979 | Nazarenus | 408/112 X |

FOREIGN PATENT DOCUMENTS

| | | | |
|---|---|---|---|
| 220882 | 9/1958 | Australia | 408/112 |
| 182127 | 3/1907 | Fed. Rep. of Germany | 408/112 |
| 545524 | 3/1932 | Fed. Rep. of Germany | 408/112 |
| 372036 | 5/1973 | U.S.S.R. | 408/84 |
| 640862 | 8/1950 | United Kingdom | 408/84 |

*Primary Examiner*—Daniel W. Howell
*Attorney, Agent, or Firm*—John R. Duncan; Frank D. Gilliam

[57] ABSTRACT

A tool to be used in cooperation with a rotatable drill having a shoulder portion and a shank portion to remove set rivets securing parts together. The tool includes a hollow compressible means which surrounds the drill. The compressible means is provided at one end with a relieved surface having a contour that mates with the head of the rivet and with a central bore through which passes the drill. Spacers may be provided between the shoulder portion of the drill and the tool as well as may be friction reducing. The drill is moved toward the head of the set rivet through the tool and into cutting engagement with the rivet head to cut away the central portion of the rivet head without inadvertent disengagement. The tool may then be removed from the drill to permit the rivet to be knocked out of the parts or the drill may then be used to drill out the remainder of the stem of the rivet.

17 Claims, 1 Drawing Sheet

TOOL TO ASSIST IN THE REMOVAL OF RIVETS

BACKGROUND OF THE INVENTION

1. Field of the Invention

This invention relates to an improvement in the field of riveting and more particularly, but not by way of limitation, to an improved tool and arrangement of aiding in the removal of rivets used to secure parts together.

2. Description of the Prior Art

In the field of fastening parts together, riveting is a common and widely used expedient. Although there are many types of rivets used for many different applications a very common type of riveting employs a ductile metal rivet having a head and an extending stem. The stem is inserted into two aligned holes in two parts that have been placed together and the rivet is then upset or squeezed to provide a set rivet which will then securely fasten the parts together. It should be understood that the use of the term "parts" is used in its most broadest generic sense as elements such as a jig may often be considered to be a "part" for the present consideration. While rivets are most commonly used to secure parts together for the foreseeable life of the subassembly and are considered to be hard to remove as opposed to other types of fastening arrangements there are times when it is desired to use riveting as a secure means of fastening and yet remove the rivets either when not properly installed or after a temporal use.

For example, in the art of adhesively bonding together honeycomb sandwich panels or other structures for aerospace applications it is known to use ductile metal rivets to firmly secure the parts to the bond jig so that they do not become inadvertently dislodged during the curing of the assembled parts under pressure and elevated temperature and cause the parts to be scrapped. While riveting provides a sure means of fastening the parts or "tacking" the parts to the bond jig, a significant problem is presented in easily removing the rivets from the bond jig and the attached parts while avoiding damage to either one.

The most common procedure that is presently utilized is for an operator to drill out the center portion of the head of the rivet thereby permitting the stem of the rivet to be knocked out or drilled out. Unfortunately, an operator often has to use a hand held power drill and has trouble drilling through the center of the highly contoured exposed head of the rivet as the drill tends to slip off the rivet head and into cutting engagement with the part or the jig. This is especially true when the rivets to be removed are oriented at ninety degrees to the surface or are at other undesired angles or in hard to reach locations.

One such tool to solve this problem is seen on page 113 of the NASA Tech Briefs dated January/February 1986. This tool comprises a bushing with a base contoured to match a rivet head. The bushing is inserted in a handle which is to be held in one hand by the operator while he simultaneously inserts a power driven drill through the bushing to drill out the rivet. While this tool may be acceptable for removing rivets from flat panels in a laboratory environment it is not acceptable for use in a production environment. In such an environment it would be difficult for the operator to maintain the bushing on the rivet head in an operative manner while simultaneously controlling a power drill, especially in the awkwardly located and oriented locations encountered in production environments. Thus, until the advent of the subject invention a tool has not been available for easily removing set rivets from parts in a production environment. Of interest with respect to the present invention is the art of drill stops for regulating drill depth. For example, U.S. Pat. No. 5,078,552 is directed to a Guide/Drill Stop For Regulating Drill Depth but this type of invention is only concerned with determining drill depth and not with removing set rivets.

None of the prior uncovered art discloses a tool and arrangement for removing set rivets from associated parts and jigs in conventional production environments with a minimum of effort and minimal damage to such parts and jigs.

SUMMARY OF THE INVENTION

In accordance with a preferred embodiment of the present invention, there is provided a tool to be used in cooperation with a drill having a shoulder portion adjacent to the shank portion to remove set rivets securing parts together. The tool comprises hollow compressible means adapted to surround a rotatable drill and to be compressed a predetermined distance and a member secured to said compressible means and having an end adapted to engage the contoured head of a set rivet. The engaging member is provided with a central aperture to permit passage of the drill as the compressible member is compressed to permit the rotatable drill to remove the central portion of the engaged rivet heat which extends above the outer surface of a secured part. As the compressible means compresses it assures that the attached engaging means which preferably has a relieved portion that is contoured to match the contour of the rivet head from slipping off the rivet head. After the center portion of the rivet head is drilled out the rivet may then be knocked out by a punch or drilled out.

Other features and attendant advantages of the present invention will become apparent to those skilled in the art from a reading of the following detailed description constructed in accordance with the accompanying drawings and wherein:

DETAILED DESCRIPTION OF THE PREFERRED EMBODIMENT

Figure 1:
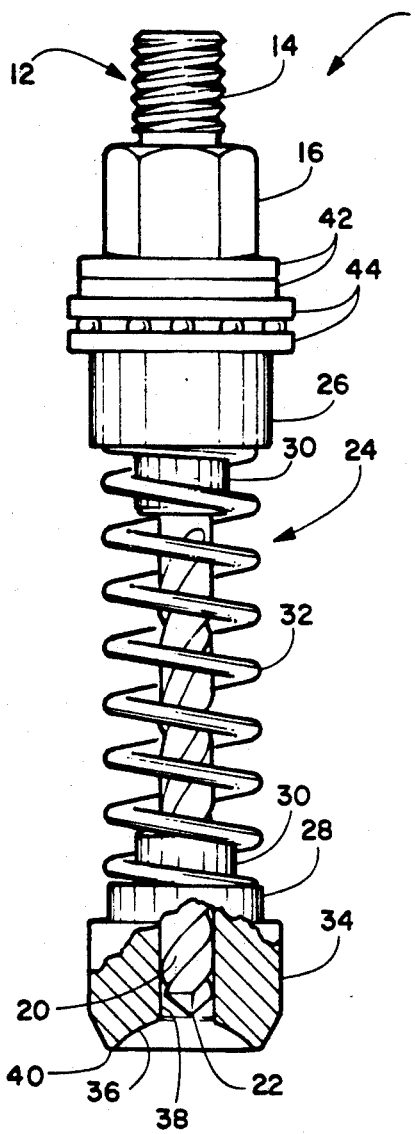
FIG. 1 is a plan view of a tool illustrating a preferred embodiment of the invention used to assist in the removal of set rivets.

Referring to the drawings in detail and in particular to FIG. 1, reference character 10 generally designates a tool that has been constructed in accordance with a preferred embodiment of the present invention. The tool 10 is adapted to be used in a cooperative arrangement with a suitable drill 12 that is provided with a threaded portion 14 for being threadedly secured within a suitable power drill chuck (not shown). The drill bit 12 is also provided with a conventional faceted shoulder portion and a smooth shank portion 18, seen most clearly in FIG. 5. The drill 12 is also provided with a conventional threaded portion 20 and a cutting portion. By way of example and not by way of limitation, a drill bit that has been used to advantage in removing set rivets commonly encountered in aerospace bond jigs is a 0.185 diameter drill bit for a rivet hole diameter of from 0.192 to 0.198 inches. It should be understood that tools which accommodate smaller or larger size drills can be used to practice this invention.

A hollow compressible means 24 is adapted to be slipped over the shank 18 and drill portion 20 of the drill bit 12. This compressible means 24 comprises two spaced annular ring members 26 and 28, each of which is provided with a relieved shoulder portion 30, seen most clearly in FIG. 5, for securing a spring member 32. Secured to member 28 is an engaging member 34 which has a relieved portion 36 at its outer end. Preferably, the relieved portion 36 has a contour which mates with the contour of a head of a set rivet. The engaging member 34 is also provided with a central bore 38 that is in alignment with the axis of a set rivet when the face 40 of the engaging member is placed against a part so that the contoured portion 36 of the engaging member 34 mates the head of the set rivet. This is seen most clearly in FIG. 3.

Figure 5:
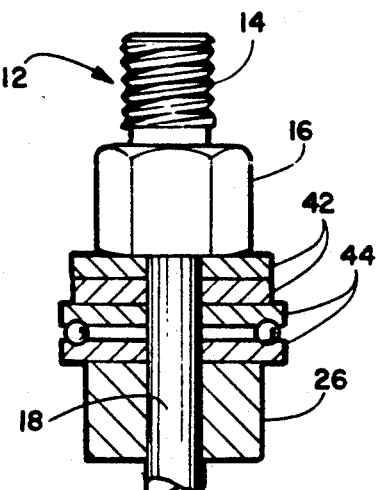
FIG. 5 is a partial sectional of a portion of the tool of FIG. 1 and illustrates the inclusion of a friction reducing means to reduce relative rotation between the drill and the tool.

To control the extension of the drill 12 within the tool 10 a spacer means is interposed between the shoulder 16 and the member 26 of the compressible means. This spacer means may take the form of one or more washers 42. To reduce friction between the washer 42 and adjacent members 16 and 26, the washer 42 may be coated with a suitable solid lubricant such as TEFLON as well as such adjacent parts. Further, if in a particular application it is desired to reduce friction between the shoulder 15 and the washer 42, if inserted, and the annular member 26 of the compressible means even further to reduce any relative rotation therebetween a suitable ball race 44 may also be inserted as seen in FIG. 5.

Figure 2:
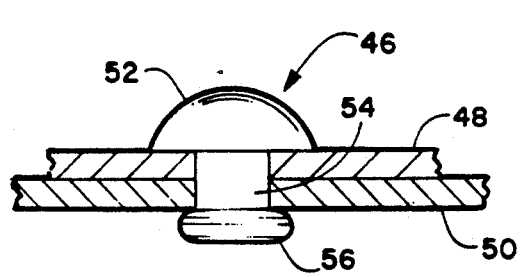
FIG. 2 is a plan view of a set rivet to be removed with the parts secured by the set rivet shown in section.
Figure 3:
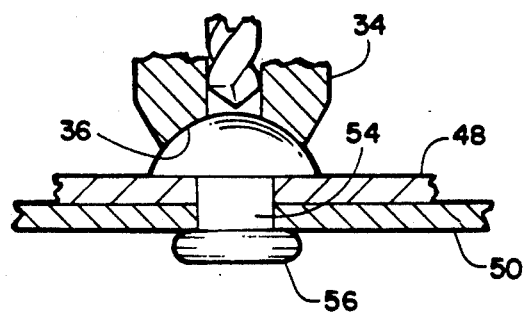
FIG. 3 is a partial sectional view showing the engaging means of the tool of the instant invention operatively positioned on the head of the rivet of FIG. 1.
Figure 4:
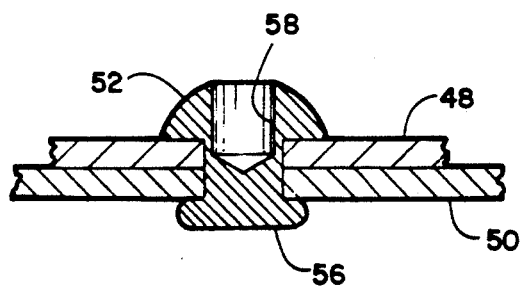
FIG. 4 is a plan view of the set rivet of FIG. 1 after the subject tool has been used to drill out the head of the set rivet to permit further complete removal of the rivet.

Referring now to FIGS. 2, 3, and 4, the work to be performed by the arrangement of the present invention will be more clearly understood. A rivet 46 used to secure two parts 48 and 50 together is provided with a contoured head portion 52, a stem portion 54 having a predetermined diameter, and an upset portion 56. The tool 10 is positioned over the head 52 of the rivet 46 with the end 22 slightly out of engaging contact with the head 52. The face 40 of the engaging member 34 is in contact with the part 48 and the contoured portion 36 of the member 34 mates with the head 52. The rotating drill bit 12 is then urged inwardly to drill out the center 58 of the head 52, as seen in FIG. 4. It is to be understood that as the drill bit 12 is driven into the head 52 the spring 32 compresses to maintain a constant pressure between the head 52 and the engaging member 34 and preclude the drill bit 12 from slipping off the surface of the head 52 and injuring the surface of the part 48.

At this point the rivet 46 looks approximately as in FIG. 4 and the operator may then scrape away the remaining portion of the head 52 and then remove the tool 10 from the drill 12 and drill out the stem 54 of the rivet 46 or use a suitable punch to knock out the stem 54 from the parts 48 and 50. It will be recognized that the diameter of the drill portion 20 is preferably approximately the same diameter as that of the stem 54 of the rivet 46.

From the foregoing it will be understood that a tool and drill arrangement have been disclosed which is simple and inexpensive to fabricate but which may be easily used by an operator to efficiently remove set rivets in a production environment. Although the present invention has been shown and described with reference to a particular embodiment, nevertheless, various changes and modifications obvious to one skilled in the art to which the invention pertains are deemed within the purview of the invention. For example, the engaging means is seen as secured to a member of the compressible means but the engaging head 34 and the member 28 could be constructed as a unitary member. Numerous other such modifications could be made within the scope of the invention.

What is claimed is:

1. A tool to be used in cooperation with a drill having a shoulder portion adjacent to a shank portion to remove set rivets securing parts together and comprising:

hollow compressible means adapted to surround a rotatable drill and to be compressed a predetermined distance;

a member secured to said compressible means and having a relieved end portion adapted to engage the contoured head of a set rivet, said member being provided with a central aperture to permit passage of the drill as the compressible member is compressed to permit the rotatable drill to remove the central portion of the engaged rivet head which extends above the outer surface of a secured part; and spacer means interposed between the shoulder portion of the drill and the member for controlling the longitudinal travel of the drill through the tool.

2. The tool of claim 1 wherein the compressible means includes a spring that is secured at each end to an annular member having a central bore.

3. The tool of claim 2 wherein each annular member is provided with a shoulder portion for receiving an end of the spring.

4. The tool of claim 3 wherein the engaging member is provided with a relieved portion for receiving and surrounding the head of a rivet.

5. The tool of claim 4 wherein the shape of the relieved portion of the engaging head is configured to receive and closely surround the outer surface of the rivet head.

6. The tool of claim 5 wherein the central aperture of the engaging means is oriented with the configuration of the relieved portion to permit the passage of the drill through the axis of the set rivet.

7. The tool of claim 1 further comprising a friction reducing means interposed between the shoulder portion of the drill and the member to reduce friction therebetween when the tool is being used to remove a set rivet.

8. The tool of claim 7 wherein the friction reducing means comprises an annular member provided with at least one ball race to permit ease of relative rotation between the shoulder portion of the drill and the tool.

9. The tool of claim 1 wherein the spacer includes at least one washer having a central bore large enough to permit easy passage of the drill therethrough.

10. The tool of claim 9 wherein the surface of a washer is coated with a suitable solid lubricant.

11. The tool of claim 1 wherein the length of the tool is determined so that when the tool is placed upon the drill for engagement by the drill with the head of the rivet, the drill bit portion of the drill does not extend into the relieved portion of said member.

12. An arrangement for removing set metal rivets securing parts together and comprising:
   a rotatable drill having a predetermined length and being provided with a shank portion and a shoulder portion at one end thereof;
   a hollow compressible means adapted to surround the drill and to be compressed a predetermined distance;
   a member secured to an end of said compressible means and having an end adapted to engage the head of a set rivet, said engaging member being provided with a central aperture to permit passage of the drill therethrough as the compressible member is compressed by engagement with the shoulder portion of the drill to permit the rotatable drill to remove at least the central portion of the engaged drill head which extends above the outer surface of a secured part; and
   spacer means interposed between the shoulder portion of the drill and member for controlling the extension of the drill through the tool as the compressible member is compressed in drilling out the center of a set rivet.

13. The arrangement of claim 12 wherein the compressible means includes a spring that is secured at one end to an annular member adjacent the spacer means and having a central bore and at the other end to the engaging member.

14. The arrangement of claim 12 wherein the engaging member is provided with a relieved portion that is contoured to mate with the contour of the exposed head of a set rivet to be removed.

15. The arrangement of claim 14 wherein the central aperture of the engaging member is oriented with respect to the contour of the head of a set rivet to be removed to permit the passage of the drill through the axis of the set rivet.

16. The arrangement of claim 15 wherein the diameter of the drill is substantially the same diameter of the stem of the set rivet.

17. The arrangement of claim 12 wherein friction reducing means is interposed between the shoulder portion of the drill and the engaging means to reduce friction and relative movement therebetween when the arrangement is used to remove a set rivet.

* * * * *